United States Patent
Fukuda et al.

(10) Patent No.: US 7,687,187 B2
(45) Date of Patent: Mar. 30, 2010

(54) POLYMER ELECTROLYTE FUEL CELL

(75) Inventors: Kaoru Fukuda, Wako (JP); Taku Eguchi, Wako (JP); Makoto Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1394 days.

(21) Appl. No.: 11/098,425

(22) Filed: Apr. 5, 2005

(65) Prior Publication Data
US 2005/0227138 A1    Oct. 13, 2005

(30) Foreign Application Priority Data
Apr. 7, 2004    (JP) .............................. 2004-112673

(51) Int. Cl.
*H01M 4/00*    (2006.01)
(52) U.S. Cl. .............................. 429/44; 429/42; 429/33
(58) Field of Classification Search .................. 429/33, 429/44, 42
See application file for complete search history.

(56) References Cited

U.S. PATENT DOCUMENTS

| | | | |
|---|---|---|---|
| 6,780,388 B2 | 8/2004 | Masuko et al. | |
| 6,916,575 B2 | 7/2005 | Hori et al. | |
| 7,094,492 B2 | 8/2006 | Matsubara et al. | |
| 7,208,242 B2 * | 4/2007 | Asano et al. .................. 429/33 |
| 2001/0033954 A1 * | 10/2001 | Gyoten et al. .................. 429/21 |
| 2002/0051903 A1 * | 5/2002 | Masuko et al. ................. 429/44 |
| 2003/0091891 A1 | 5/2003 | Yoshida et al. | |

FOREIGN PATENT DOCUMENTS

| | | |
|---|---|---|
| JP | 9-245801 A | 9/1997 |
| JP | 2000-208153 A | 7/2000 |
| JP | 2000-268828 A | 9/2000 |
| JP | 2000-357857 A | 12/2000 |
| JP | 2002-015745 A | 1/2002 |
| JP | 2003-115302 | 4/2003 |
| WO | WO 01/92151 | 12/2001 |

* cited by examiner

*Primary Examiner*—Patrick Ryan
*Assistant Examiner*—Ben Lewis
(74) *Attorney, Agent, or Firm*—Arent Fox LLP

(57) ABSTRACT

A polymer electrolyte fuel cell consists of plural units, and the unit has an anode side separator, an anode diffusion layer, an anode catalytic layer, polymer electrolyte membrane, a cathode catalytic layer, a cathode diffusion layer, and a cathode side separator. The cathode catalytic layer further includes a catalyst in which platinum or platinum alloy is supported on a carbon supporting body having an average lattice space d002 of [002] surface of 0.338 to 0.355 nm and specific surface area of the supporting body of 80 to 250 $m^2/g$, electrolyte containing ion exchange resin, and vapor grown carbon fiber. Furthermore, a water holding layer containing ion exchange resin, carbon particles, and vapor grown carbon fiber is arranged at an interface of the cathode diffusion layer and the cathode catalytic layer.

4 Claims, 2 Drawing Sheets

POLYMER ELECTROLYTE FUEL CELL

BACKGROUND OF THE INVENTION

1. Technical Field

The present invention relates to a polymer electrolyte fuel cell, and in particular, relates to a technique for improving power generation efficiency in high-voltage operation.

2. Background Art

Recently, exhaustion of petroleum resources is a crucial issue, and environmental problems such as air pollution and global warming caused by consumption of fossil fuels have become serious. Under these circumstances, fuel cells have attracted much attention as a clean power source for electric motors in which carbon dioxide is not generated, and such fuel cells are being widely developed and used.

In the case in which such a fuel cell is used in a vehicle, a polymer electrolyte fuel cell in which a polymer electrolyte membrane is used is desirably used since high voltage and large current can be obtained. A membrane electrode assembly for the polymer electrolyte fuel cell is produced as follows: a catalyst such as platinum is carried by a catalyst carrier such as carbon black; a pair of electrode catalytic layers is made by unifying the catalyst and an ion conducting polymer binder; a polymer electrolyte membrane having ion conductivity is disposed between the electrode catalytic layers; and a gas-diffusion layer is formed on each of the electrode catalytic layers. Furthermore, a separator which also functions as a gas passage is formed on each of the gas-diffusion layers to yield a polymer electrolyte fuel cell.

In such a polymer electrolyte fuel cell, a reducing gas, such as hydrogen or methanol, is introduced at one electrode catalytic layer (fuel electrode) through the gas-diffusion layer of the fuel electrode side, and an oxidizing gas such as air or oxygen is introduced at the other electrode catalytic layer (oxygen electrode) through the gas-diffusion layer of the oxygen electrode side. In the fuel electrode, due to the existence of the catalyst in the electrode catalytic layer, protons ($H^+$) and electrons are generated from the reducing gas, and protons migrate to the electrode catalytic layer of the oxygen electrode side through the polymer electrolyte membrane. In the oxygen electrode, due to the existence of the catalyst in the oxygen electrode, protons react with the oxidizing gas introduced at the oxygen electrode and electrons to produce water. Therefore, by electrically connecting the fuel electrode and the oxygen electrode with a lead, a circuit in which electrons generated in the fuel electrode migrate to the oxygen electrode is formed, and electric current is obtained.

At the cathode of the polymer electrolyte fuel cell, water is generated by reduction reaction of protons and oxygen which is an oxidizer. Therefore, in a high-voltage operation, water is generated faster than water vapor at the cathode can be exhausted, and as a result, a blockage (flooding) phenomenon of micropores of the electrode by condensation of water vapor may easily occur. If the flooding phenomenon occurs, the number of reaction sites is reduced, the reaction cannot be promoted efficiently, and it would be difficult to obtain reliable properties for a long period.

To solve such a problem, a technique in which graphitized carbon supporting a noble metal which is a catalyst component of the cathode is used, is disclosed (see Japanese Unexamined Patent Application Publication No. 2000-268828, 2000-357857, 2002-015745). In the technique, since the graphite is water-repellent, water is exhausted immediately, and the flooding can be restrained.

However, the number of functional groups on the surface of the supporting body and specific surface area are reduced by a heat treatment of graphitization, and as a result, the water holding property of graphite in the electrode is deteriorated. Therefore, under a low humidity operation, i.e., not more than 50% humidity, required water is in short supply, an activation over voltage of catalytic reaction is increased, and power generation efficiency is deteriorated.

SUMMARY OF THE INVENTION

The present invention was completed in view of the above-mentioned circumstances, and an object of the invention is to provide a polymer electrolyte fuel cell having superior power generation efficiency under high voltage operation, particularly under low humidity operation.

The polymer electrolyte fuel cell of the present invention has plural units which are stacked, and each unit includes an anode side separator, an anode diffusion layer, an anode catalytic layer, a polymer electrolyte membrane, a cathode catalytic layer, a cathode diffusion layer, and a cathode side separator, stacked in this order. The cathode catalytic layer has a catalyst in which platinum or platinum alloy is supported on supporting carbon having an average lattice spacing of [002] surfaces (d002) of 0.338 to 0.355 nm and specific surface are of supporting body of 80 to 250 $m^2/g$, an electrolyte containing ion exchange resin, and a vapor grown carbon fiber. The surface of the cathode diffusion layer which contacts to the catalytic layer includes a water holding layer containing ion exchange resin, carbon particles, and vapor grown carbon fiber.

In such a polymer electrolyte fuel cell of the present invention, since the water holding layer having ion exchange resin, carbon particles, and vapor grown carbon fiber is arranged, water generated by the reaction is held in this water holding layer. Therefore, in the case in which water is in short supply in the catalytic layer under low humidity operation, water is supplied from the water holding layer, and as a result, increasing of activation over voltage can be restrained.

EMBODIMENTS OF THE INVENTION

The membrane electrode assembly (MEA) for the polymer electrolyte fuel cell of the present invention is further explained below.

Figure 1:
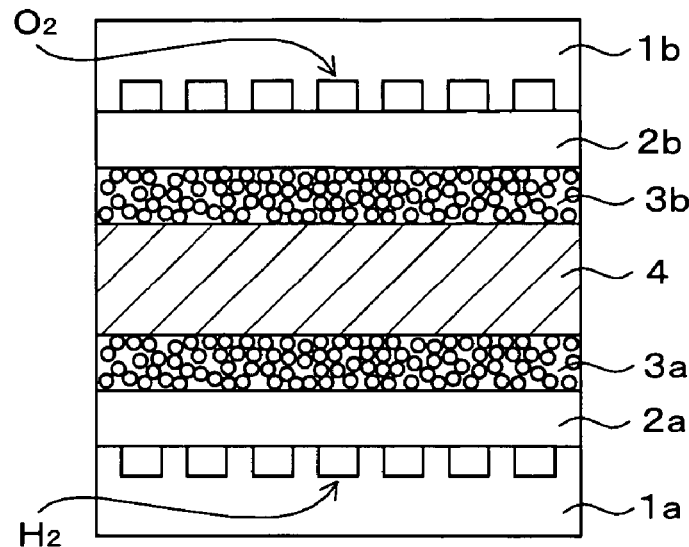
FIG. 1 is a conceptual diagram showing a cross section of a conventional membrane electrode assembly.

FIG. 1 shows a conceptual diagram of a conventional MEA. In FIG. 1, reference numeral 1a and 1b are an anode side separator and a cathode side separator, 2a and 2b are an anode diffusion layer and a cathode diffusion layer, 3a and 3b are an anode catalytic layer and a cathode catalytic layer, and 4 is a polymer electrolyte membrane.

Fuel gas such as hydrogen gas supplied from the anode side separator 1a is diffused in the anode diffusion layer 2a, and is ionized to protons and electrons in the anode catalytic layer 3a. Electrons are sent to an outer electric circuit, and protons are diffused to the anode side penetrating the polymer electrolyte membrane 4. On the other hand, oxidizing gas such as oxygen is supplied from the cathode side separator 1b, is diffused in the cathode diffusion layer 2b, and reaches the cathode catalytic layer 3b. Protons and oxygen which arrived the cathode catalytic layer 3b react with electrons which is supplied from the outer circuit to generate water.

Figure 2:
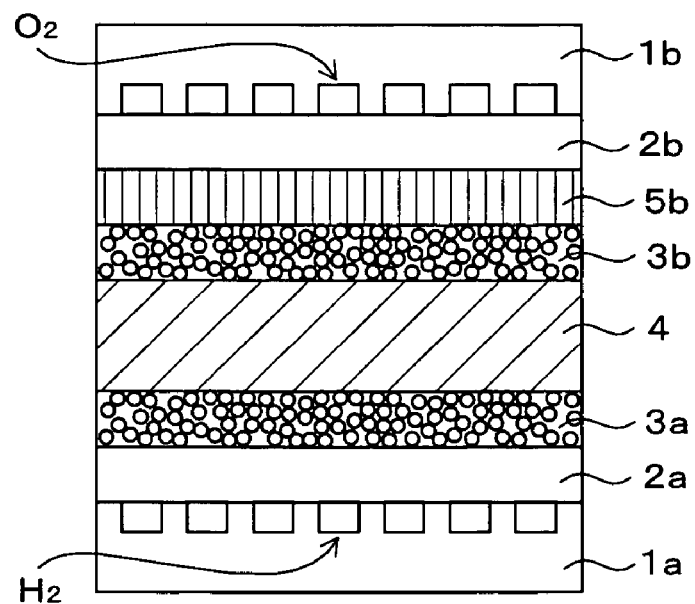
FIG. 2 is a conceptual diagram showing a cross section of a membrane electrode assembly having water holding layer which is an embodiment of the present invention.

FIG. 2 shows a conceptual diagram of a MEA of an embodiment of the present invention. This MEA is different from the MEA of FIG. 1 in the point that the water holding layer 5b is arranged at the interface of the cathode diffusion layer 2b and the cathode catalytic layer 3b. This water holding layer includes ion exchange resin, carbon particles, and vapor grown carbon fibers, and has higher hydrophilicity compared to the cathode catalytic layer 3b. The conventional MEA has a catalytic layer having lower water holding property, and can restrain flooding or the like; however, under low humidity operation, a necessary amount of water cannot be retained and efficiency is deteriorated. By arranging such a water holding layer, water is supplied from the water holding layer to the catalytic layer when water runs short, to restrain efficiency deterioration under the low humidity operation.

In particular, in the MEA containing graphitized support catalyst in the catalytic layer of the present invention, since the number of functional groups on the surface of the supporting body and specific surface area are reduced and the water holding property is particularly deteriorated accompanied by the graphitization, water exhaust property of the graphitized support catalyst can be maintained and the necessary amount of water can be held by arranging the water holding layer of the present invention.

Figure 3:
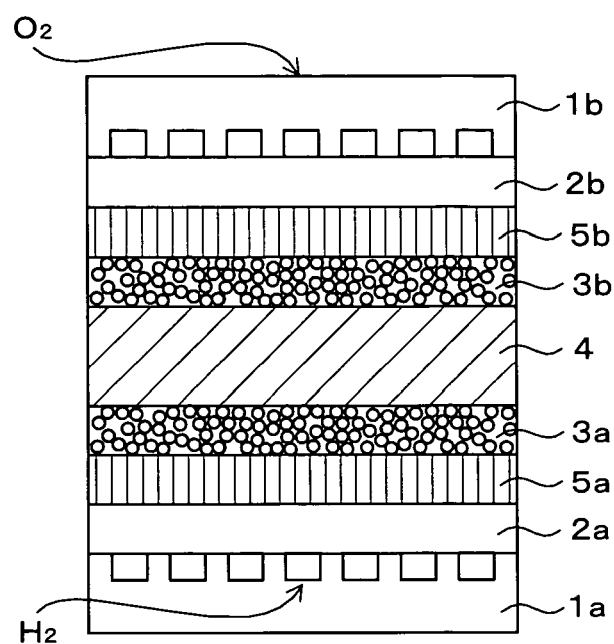
FIG. 3 is a conceptual diagram showing a cross section of a membrane electrode assembly having a water holding layer which is another embodiment of the present invention.

FIG. 3 shows a conceptual diagram of a MEA of another embodiment of the present invention. In this embodiment, an anode side water holding layer 5a is arranged at the interface of the anode diffusion layer 2a and the anode catalytic layer 3a in addition to the cathode side water holding layer 5b of FIG. 2. In such an embodiment, water held by the anode side water holding layer 5a is reversely diffused to the cathode side accompanied by diffusion of protons from the anode side to the cathode side, and appropriate amount of water is constantly supplied when water in the cathode side is in short supply.

As the catalytic layer of the present invention, the graphitized support catalyst is used as described above, and the reason is explained below.

In a conventional MEA in which a graphitized support catalyst is not used, a high-voltage which occurs at an area of low current density promotes an electric potential corrosion reaction of carbon catalyst supporting body in the catalytic layer, sulfonic acid groups and fluorinated acid groups contained in electrolyte of the catalytic layer elute and reduce the pH of water which is generated and exhausted from the MEA, and corrosion at the interface of the metallic separator and the MEA is promoted. As a result, MEA is contaminated by metallic ions generated by the corrosion of the metallic separator, and furthermore, contact resistance is increased by the corrosion of the contact surface of the metallic separator and the catalytic layer. Efficiency of the MEA is greatly deteriorated.

In the present invention, since a heat treatment is performed on the catalyst supporting body to obtain the graphitized support catalyst, properties against electric potential corrosion are improved. Therefore, decomposition of the catalytic layer and elution of sulfonic acid groups and fluorinated acid groups from the electrolyte can be restrained even under high voltage operation, and as a result, efficiency deterioration of MEA can be restrained. As such a graphitized support catalyst, the graphitized support catalyst having a single phase of crystal layer, graphitized degree of in a range of 0.338 to 0.355 nm by the d002 value is used. Furthermore, it is necessary that the specific surface area of the supporting body be in a range of 80 to 250 $m^2$/g, the powder density be in a range of 0.30 to 0.45 g/ml.

Vapor grown carbon fiber of any fiber diameter can be used in the MEA of the present invention. In particular, it is desirable that the diameter be in a range of 100 to 200 nm. Such vapor grown carbon fiber forms a large number of micropores having appropriate size in the layer, the pores function as flow passages which aid smooth migration of water and fuel. As a result, not only is the efficiency of the fuel cell improved, but internal resistance of the fuel cell can also be reduced since new conductive paths are generated.

In the present invention, an electrolyte membrane having sulfonated polyarylene polymer shown in Chemical Formula 1 can be used as a polymer electrolyte membrane. A polyarylene based electrolyte membrane can increase ion exchange capacity compared to a conventional fluorine-based electrolyte membrane, and it can also increase the water content of the electrolyte membrane. Therefore, water generated by reaction of the fuel cell can be held by this electrolyte membrane. As a result, water is absorbed to maintain water repellent property of the catalytic layer and to restrain increase of concentration over voltage in the case in which the water in the catalytic layer is in excess, and water is supplied to the catalytic layer by reverse diffusion to restrain decomposition of catalyst and elution of electrolyte in the case in which the water in the catalytic layer is in short supply. That is, MEA which can perform efficiently in both conditions of high humidity and low humidity can be provided.

As a sulfonated polyarylene mentioned above, polymers shown in Chemical Formula 1 below can be mentioned.

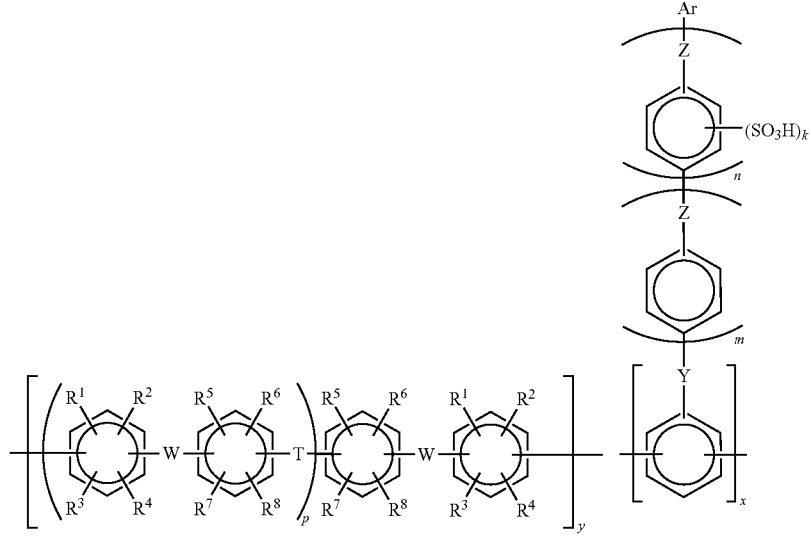

Chemical Formula 1

In Chemical Formula 1, Y is a bivalent electron attracting group, practically, —CO—, —SO$_2$—, —SO—, —CONH—, —COO—, —(CF$_2$)$_l$— (wherein l is an integer of 1 to 10), and —C(CF$_3$)$_2$— may be mentioned. B is a bivalent electron donating group or a covalent bond, practically, —CH$_2$—, —C(CH$_3$)$_2$—, —O—, —S—, —CH=CH—, —C≡C—, or compounds shown in Chemical Formula 2.

Chemical Formula 2

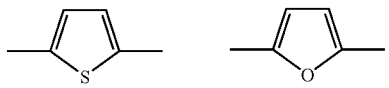

It should be noted that the electron attracting group is a group having a Hammett substituent constant of not less than 0.06 in the case of the phenyl group being at the meta position, and not less than 0.01 in the case of it being at the para position. Ar is an aromatic group having the substituent shown as —SO$_3$H. As the aromatic group, a phenyl group, naphthyl group, anthracenyl group, or phenanthyl group can be mentioned. Among these groups, the phenyl group and the naphthyl group are desirable. m is an integer from 0 to 10, desirably from 0 to 2, n is an integer from 0 to 10, desirably from 0 to 2, and k is an integer from 1 to 4.

In Chemical Formula 1, groups from R$^1$ to R$^8$ can be the same or different, the groups are at least one kind of atom or group selected from hydrogen atom, fluorine atom, alkyl group, fluorine substituted alkyl group, allyl group, aryl group, or nitrile group. As the alkyl group, methyl group, ethyl group, propyl group, butyl group, amyl group, or hexyl group may be mentioned, and in particular, methyl group, ethyl group or the like is desirable. As the fluorine substituted alkyl group, trifluoromethyl group, perfluoroethyl group, perfluoropropyl group, perfluorobutyl group, perfluoropentyl group or perfluorohexyl group may be mentioned, and in particular, trifluoromethyl group, pentafluoroethyl group or the like is desirable. As the allyl group, propenyl group may be mentioned, and as the aryl group, phenyl group or pentafluorophenyl group may be mentioned. W is a bivalent electron attracting group or a single bond, T is a bivalent organic group or a single bond, and p is 0 or a positive integer, the upper limit of p is ordinarily 100, desirably in a range of 10 to 80. x and y is a mol ratio in the case in which x+y=100 mol %. x is in a range of 0.5 to 100 mol %, desirably in a range of 10 to 99.999 mol %, y is in a range of 99.5 to 0 mol %, desirably in a range of 90 to 0.001 mol %.

As the separator of the present invention, a metallic separator, carbon separator, or any other kind of separator can be used, and in particular, the metallic separator is desirable. The metallic separator is inexpensive compared to the carbon separator; however, since the metallic separator is corroded by acid in water mentioned above, an expensive carbon separator has been used in a conventional MEA. However, since the present invention solves the problem of corrosion of the metallic separator, an inexpensive metallic separator can be desirably used.

The metallic separator of the present invention is not particularly limited, but from the viewpoints of anti-corrosion property, contact electric resistance or the like required of a separator for the polymer electrolyte fuel cell, an aluminum-based alloy, iron-based alloy, nickel-based alloy, titanium-based alloy or the like are desirable since they have high anti-corrosion property and low contact electric resistance.

Furthermore, a separator at the surface of the metallic base material is degreased and washed, and a thin layer of a noble metal formed by plating, vapor deposition, sputtering, or CVD, can also be used. As a noble metal, from the viewpoint of improving the properties such as corrosion resistance and contact electric resistance, gold, silver, platinum, palladium, or an alloy of these metals is particularly desirable.

Figure 4:
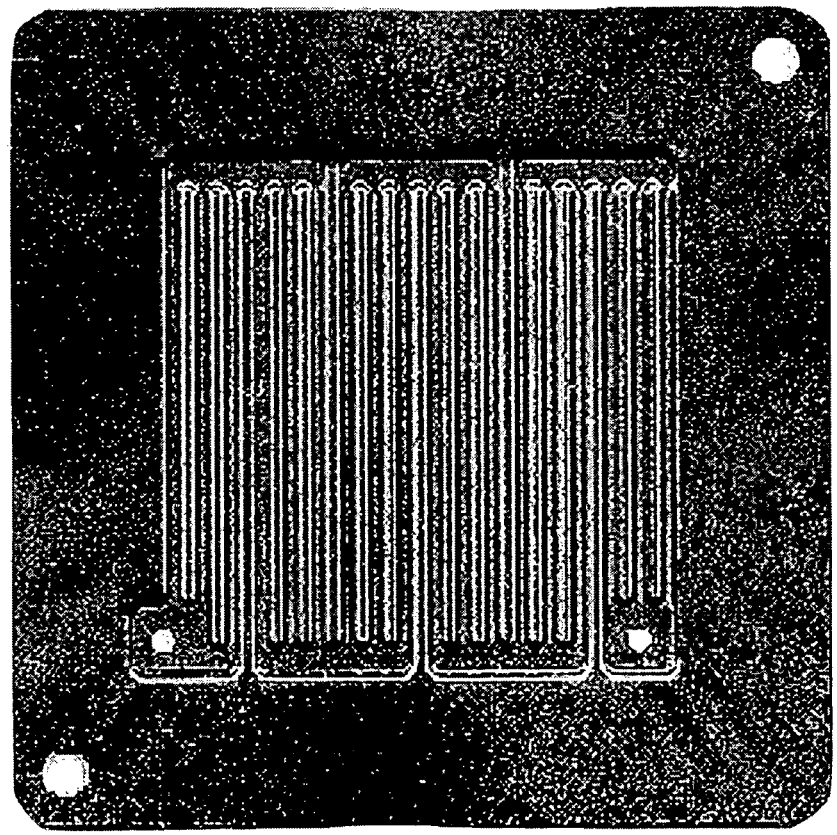
FIG. 4 is an example of a metallic separator used in the polymer electrolyte fuel cell of the present invention.

On the metallic separator mentioned above, press forming is performed to form flow passages of a fuel gas or oxidizing gas, to obtain a metallic separator for polymer electrolyte fuel cells. FIG. 4 shows an embodiment of such a separator.

EXAMPLES

The present invention is further explained by way of Examples; however, the present invention is not limited thereto.

A. Investigation of Water Holding Layer

Example 1

Carbon black (trade name: Ketjen black EC, produced by Cabot) was graphitized by a heat treatment at 2800° C. Platinum was put on the carbon black so that there was a 50:50 of weight ratio of carbon black and platinum, to prepare a graphitized support catalyst. 10 g of this graphitized support catalyst, 35 g of ion conductive polymer solution (trade name: Nafion DE2020), and 1.84 g of crystalline carbon fiber (VGCF, produced by Showa Denko) were mixed to prepare a cathode catalyst paste. This catalyst paste was coated on a FEP sheet so that there was 0.3 mg/cm$^2$ of Pt, and this was dried to prepare electrode sheet A.

36.8 g of ion conductive polymer solution (Nafion SE20192) and 10 g of Pt—Ru supporting carbon particle (trade name: TEC61E54, produced by Tanaka Kikinzoku Kogyo) were mixed to prepare an anode catalyst paste. This catalyst paste was coated on a FEP sheet so that there was 0.15 mg/cm$^2$ of Pt, and this was dried to prepare electrode sheet B.

The electrode sheets of the anode and the cathode were transferred to an electrolyte membrane (trade name: Nafion 112, produced by DuPont) by a decal method (unification pressure: 30 kg/cm$^2$) to prepare a membrane-electrode complex CCM.

The following raw materials were mixed to prepare a ground layer (CT layer, carbon particles+Teflon) paste.

| | |
|---|---|
| Carbon black (trade name: VulcanXC-72R, produced by Cabot) | 12 g |
| PTFE | 18 g |
| Solvent (Ethylene glycol) | 155 g |

The following raw materials were mixed to prepare a water holding layer paste.

| | |
|---|---|
| Carbon black (trade name: Ketjen black EC, produce by Cabot) | 5 g |
| Ion conductive polymer solution (trade name: Nafion DE2021) | 25 g |
| Crystalline carbon fiber (VGCF, produce by Showa Denko) | 2.53 g |

The ground layer paste was coated on a carbon paper which was treated to be water repellent and was dried, and the water holding layer paste was coated so there was 0.3 mg/cm$^2$ and this was dried to prepare the cathode side diffusion layer. The ground layer paste was coated to a carbon paper which was treated to be water repellent and was dried to prepare the anode side diffusion layer. The CCM was put between these diffusion layers to prepare MEA.

Comparative Example 1

Except for not coating the water holding layer paste at the cathode side diffusion layer, the MEA of Comparative Example 1 was prepared in a manner similar to that of Example 1.

Fuel cells were prepared using these MEAs, initial voltage under high humidity operation (80%) was measured. Furthermore, initial voltage under low humidity operation (30%) and voltage after 1000 hours durability test were measured. The results are shown in Table 1.

TABLE 1

|  | High humidity (80%) | Low humidity (30%) | |
| --- | --- | --- | --- |
|  | Initial | Initial | After 1000 hours |
| Example 1 | 0.64 V | 0.64 V | 0.61 V |
| Comparative Example 1 | 0.62 V | 0.60 V | 0.54 V |

As is clear from Table 1, efficiency under high humidity operation is improved to some extent, and in particular, efficiency under low humidity operation is greatly improved. It is assumed that water is supplied from the water holding layer when the water in the catalytic layer is in short supply, to restrain deterioration of the catalytic layer.

Furthermore, in the present invention, since vapor grown carbon fiber is contained in the catalytic layer, appropriate micropores are formed, and smooth migration of water from the water holding layer is aided in low humidity operation.

B. Investigation of Addition of Polyarylene to Electrolyte Membrane

Example 2

Except for using sulfonated polyarylene membrane as the electrolyte membrane instead of Nafion 112, MEA of Example 2 was prepared as similar to Example 1. This polyarylene membrane was produced by following processes (1) to (6).

(1) Preparation of 4-[4-(2,5-dichlorobenzoyl)phenoxy]benzene sulfonic acid sodium salt (A—SO$_3$Na)

2,5-dichloro-4'-phenoxybenzophenone (A, 137.3 g, 400 mmol) was put in a 3 L three-necked flask equipped with a stirring device and cooling tube, and 500 mL of 1,2-dichloroethane (1,2-DCE) was added and dissolved. Furthermore, 2 M of acetyl sulfuric acid solution prepared by mixing 56 mL of concentrated sulfuric acid, 152 mL of acetic anhydride, and 400 mL of 1,2-DCE, was added to the flask while stirring, and the reaction was performed in an oil bath at 60° C. After the predetermined period, 300 mL of 1-propanol was added to stop the reaction. Next, the reaction liquid was concentrated to a volume of 400 mL, and NaOH aqueous solution (120 g (3 mol)/water 400 mL) was added. The remaining 1,2-DCE in the reaction liquid was removed by azeotropic distillation, and a transparent light yellow solution was obtained. The light yellow solution was cooled, and deposition was filtered. The deposition was dried in a vacuum at 70° C. to obtain a white fine powder of 4-[4-(2,5-dichlorobenzoyl)phenoxy] benzene sulfonic acid sodium salt (A—SO$_3$Na) shown in Chemical Formula 3. The crude crystal was used in the next process without being purified.

Chemical Formula 3

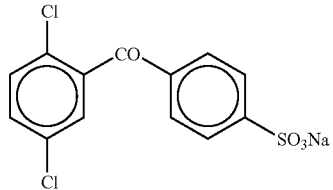

(2) Preparation of 4-[4-(2,5-dichlorobenzoyl)phenoxy]benzene sulfonic acid chloride (A—SO$_3$Cl)

Solvent (300 mL of acetonitrile and 200 mL of sulfolane) was added to 215 g (about 400 mmol) of crude crystal of A—SO$_3$Na. Furthermore, phosphoryl trichloride (245.3 g, 1.6 mol) was added and reacted at 70° C. Furthermore, 5 mL of N,N-dimethylacetamide was added, a yellow suspension was stirred for 40 minutes at 71 to 73° C., and the reaction liquid was cooled to 3° C. 1 L of cold water was added at a rate so that the temperature of the reaction liquid did not exceed 10° C. The deposit was filtered and collected, washed with cold water, and recrystallized with 350 mL of toluene to obtain 153 of white crystal of 4-[4-(2,5-dichlorobenzoyl)phenoxy]benzene sulfonic acid chloride (A—SO$_3$Cl). Yield depending on A was 87%. Melting point is 130.5 to 131.5° C.

Chemical Formula 4

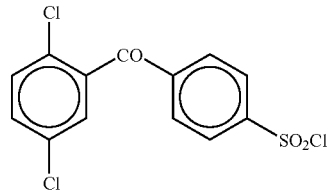

(3) Preparation of 4-[4-(2,5-dichlorobenzoyl)phenoxy]benzene sulfonic acid iso-butyl (A—SO$_3$iso-Bu)

22.09 g (50 mmol) of A—SO$_3$Cl was dripped into a solvent (4.0 g (55 mmol) of 2-methyl-1-propanol and 30 mL of pyridine) for a period of 40 minutes while cooling and mechanically stirring. A concentrated suspension was obtained. Stirring was continued for 1 hour more at 12 to 15° C. 30 mL of concentrated hydrochloric acid and 100 g of ice was added to the reaction liquid at one time. Stirring was continued until the suspension became uniform. Next, the reaction liquid was filtered by a cooled Buchner funnel quickly. A white adhesive deposit was obtained. The deposit was dissolved in 300 mL of ethyl acetate, washed with water by using a separatory funnel. An organic layer was dried with magnesium sulfate, and the solvent was removed under reduced pressure. A light yellow oily liquid obtained after condensation was dissolved in heated hexane and placed in a freezer for several days. 16.67 g of white crystals of 4-[4-(2,5-dichlorobenzoyl)phenoxy] benzene sulfonic acid iso-butyl (A—SO$_3$ iso-Bu) shown in Chemical Formula 5 was obtained at a yield of 70%. The melting point is 73 to 74° C.

Chemical Formula 5

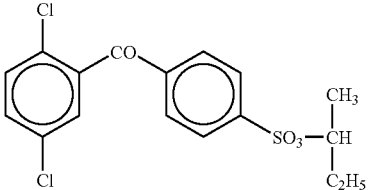

(4) Preparation of BCPAF Oligomer 67.3 g (0.20 mol) of 2,2-bis(4-hydroxyphenyl)-1,1,1,3,3,3-hexafluoropropane (bisphenol AF), 60.3 g (0.24 mol) of 4,4'-dichlorobenzophenone (4,4'DCBP), 71.9 g (0.52 mol) of potassium carbonate, 300 mL of N,N-dimethylacetamide (DMAc) 150 mL of toluene were put in a 1 L three-necked flask equipped with a stirring device, thermometer, cooling tube, Dean-Stark tube, and nitrogen introducing three necked cock. By heating and stirring under a nitrogen atmosphere, reaction was performed at 130° C. in an oil bath. Removing water which was generated during the reaction to the outside of the reaction vessel by azeotropy with toluene using the Dean-Stark tube, and about 3 hours later, generation of water was not significantly observed. Toluene was removed to the outside of the reaction vessel using the Dean-Stark tube by slowly increasing the temperature from 130 to 150° C. The reaction was continued for 10 hours at 150° C. 10.0 g (0.040 mol) of 4,4'-DCBP was added, and the reaction was continued for 5 more hours. The obtained reaction liquid was cooled, the generated inorganic deposit was removed by filtering the reaction liquid, and the filtered liquid was put into 4 L of methanol. The generated deposit was filtered to be recovered, and dried. The deposition was dissolved in 300 mL of tetrahydrofuran. This was deposited in 4 L of methanol again, to obtain 95 g of the target compound (yield: 85%).

Weight average molecular weight which is converted to polystyrene of the obtained polymer by GPC (THF solvent) was 12,500. The obtained polymer is soluble in THF, NMP, DMAc, sulfolane or the like, Tg was 110° C., and heat decomposition temperature was 498° C. The obtained compound is an oligomer (hereinafter referred to as BCPAF oligomer) shown in Chemical Formula 6.

(5) Production of Polyarylene Copolymer (Production of Polyarylene copolymer having iso-butyl group as a protecting group (PolyAB—$SO_3$i-Bu))

60 mL of dry N-methylpyrolidone (NMP) was added to a mixture of 15.34 g (32 mmol) of A—$SO_3$i-Bu obtained in Example 1, 10.52 g (1.33 mmol) of BCPAF oligomer (Mn=7,940), 0.65 g (1 mmol) of Ni(PPh$_3$)$_2$Cl$_2$, 3.50 g (13.33 mmol) of PPh$_3$, 0.65 g (4.83 mmol) of NaI, and 5.45 g (83.33 mmol) of zinc powder under a nitrogen atmosphere.

The reaction vessel was heated while stirring, finally to 74° C., and the reaction was continued for 3 hours. Increase in viscosity was observed in the reaction. The polymerized reaction liquid was diluted with 250 mL of THF, stirred for 30 minutes, and filtered using celite as a filtering aid agent. The filtered liquid was put in 1500 mL of excess amount of methanol to be solidified. The solid was filtered and dried in air, was dissolved in THF/NMP (200 mL/30 mL), and was deposited. Air drying and heat drying were performed to obtain 20.54 g of objective yellow flake-like copolymer having sulfonic acid derivatives protected by an i-butyl group (yield: 78%). Molecular weight by GPC was Mn=13,200, Mw=33,300.

(6) Conversion to Polyarylene Having Sulfonic Acid Group by Hydrolysis (Conversion from polyarylene having an i-butyl group as a protective group of sulfonic acid (PolyAB—$SO_3$i-Bu) to polyarylene having sulfonic acid group (PolyAB—$SO_3$—H)

5.08 g (2.7 mmol to $SO_3$i-Bu) of the above-mentioned PolyAB—$SO_3$i-Bu was dissolved to 60 mL of NMP, and heated at 90° C. A mixture of 50 mL of methanol and 8 mL of concentrated hydrochloric acid was added to the reaction vessel at one time. The suspended reaction liquid was reacted by warm reflux for 10 hours. Arranging a distillation device, excess methanol was removed to obtain light green transparent solution. This solution was coated on a glass plate to form a membrane. The membrane was immersed in water for 3 days, dried in air, and dried in a vacuum, to obtain film having a dried thickness of 50 μm.

MEA of a test unit was produced using the sulfonated polyarylene membrane produced by the processes (1) to (6) as an electrolyte membrane. Initial voltage of high humidity operation (80%) was measured. Furthermore, initial voltage of low humidity operation (30%) and voltage after a 1000 hour durability test were measured. The results are shown in Table 2.

|  | High humidity (80%) | Low humidity (30%) | |
| --- | --- | --- | --- |
|  | Initial | Initial | After 1000 hours |
| Example 1 | 0.64 V | 0.64 V | 0.61 V |
| Example 2 | 0.66 V | 0.66 V | 0.65 V |

Chemical Formula 6

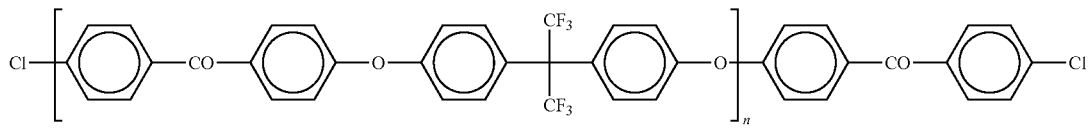

As is clear from Table 2, by using sulfonated polyarylene membrane (water content not less than 100), voltage drop after 1000 hours is restrained. It is assumed that the water retaining effect of the membrane side can be exhibited in addition to the effect of the water holding layer side, and the interaction may be obtained at both sides of the catalytic layer.

C. Investigation of Use of Metallic Separator

Example 3

A test unit was prepared by arranging a metallic separator on both sides of the MEA of Example 1.

Example 4

A test unit was prepared by arranging a carbon separator on both sides of the MEA of Example 1.

Comparative Example 2

Except for not graphitizing carbon black (trade name: Ketjen black, produced by Cabot), MEA was produced in a manner similar to that of Example 1, and the test unit was prepared by arranging a metallic separator on each side of the MEA.

Tests of power generation efficiency of the test units of Examples 3, 4, and Comparative Example 2 were performed. As a result, almost the same efficiency was exhibited in all the Examples and Comparative Example 1. However, elution of fluoric acid was observed in Comparative Example 2 and elution of fluoric acid was not observed in Example 3. In carbon generally used as a supporting body of a catalyst, high voltage is generated at an area of low current density, electric potential corrosion reaction of the carbon supporting body occurs, sulfonic acid group or fluorinated acid group of ion exchange resin in the catalytic layer elute, and as a result, the pH of water exhausted from the MEA is decreased and corrosion of the interface of the metallic separator and MEA is promoted. However, in the present invention, it is assumed that the graphitizing treatment solved the problem. By the present invention, it is desirable that an inexpensive metallic separator be used.

What is claimed is:

1. A polymer electrolyte fuel cell comprising plural units, a unit comprising:
   an anode side separator;
   an anode diffusion layer;
   an anode catalytic layer;
   a polymer electrolyte membrane;
   a cathode catalytic layer;
   a cathode diffusion layer; and
   a cathode side separator,
   the cathode catalytic layer comprising: a catalyst in which platinum or platinum alloy is supported on a carbon supporting body having an average lattice space d002 of [002] surface of 0.338 to 0.355 nm and specific surface area of the supporting body of 80 to 250 m$^2$/g; electrolyte containing ion exchange resin; and vapor grown carbon fiber,
   wherein a water holding layer containing ion exchange resin, carbon particles, and vapor grown carbon fiber is arranged at an interface of the cathode diffusion layer and the cathode catalytic layer and at an interface of the anode diffusion layer and the anode catalytic layer.

2. The polymer electrolyte fuel cell according to claim 1 wherein the catalytic layer contains a graphitized support catalyst.

3. The polymer electrolyte fuel cell according to claim 1, wherein at least one of the polymer electrolyte membrane or the ion exchange resin contains sulfonated polyarylene having structure shown in Chemical Formula 1 below

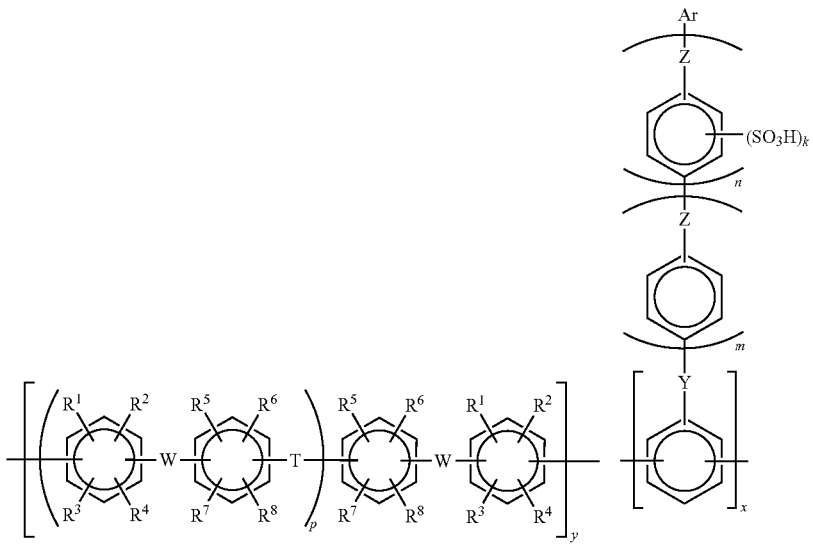

in Chemical Formula 1, Y is a bivalent electron donating group, Z is a single bond or a bivalent organic group, W is a bivalent electron attracting group, T is a bivalent organic group, groups from $R^1$ to $R^8$ can be the same or different, the groups are at least one kind of atom or group selected from hydrogen atom, fluorine atom, alkyl group, allyl group, aryl group, or nitrile group, x is in a range of 0.5 to 100, y is in a range of 99.5 to 0, m is an integer from 0 to 10, n is an integer from 0 to 10, and p is an integer from 1 to 100.

4. The polymer electrolyte fuel cell according to claim 1 wherein the separator is a metallic separator.

* * * * *